United States Patent
Elfes et al.

[11] 3,888,315
[45] June 10, 1975

[54] DRAFT SENSING APPARATUS FOR TRACTOR

[75] Inventors: Lee E. Elfes, Bloomfield Hills; Otto Mueller, Jr., Detroit, both of Mich.

[73] Assignee: Massey-Ferguson Inc., Detroit, Mich.

[22] Filed: Oct. 29, 1973

[21] Appl. No.: 410,926

[52] U.S. Cl.................. 172/7; 172/9; 280/446 A
[51] Int. Cl.......................................... A01b 63/112
[58] Field of Search .......... 172/7, 9, 10; 280/446 A; 267/41, 42, 68, 158

[56] References Cited
UNITED STATES PATENTS

| | | | |
|---|---|---|---|
| 2,946,392 | 7/1960 | Nelson | 172/7 |
| 2,996,125 | 8/1961 | Bunting | 172/9 |
| 3,022,830 | 2/1962 | Hess | 172/7 |
| 3,231,040 | 1/1966 | Blanchette | 267/41 X |
| 3,812,916 | 5/1974 | Lasoen | 172/7 |

Primary Examiner—Edgar S. Burr
Assistant Examiner—Paul T. Sewell
Attorney, Agent, or Firm—Thomas P. Lewandowski

[57] ABSTRACT

A tractor draft measuring apparatus has a transverse shaft carried by spaced fulcrums, draft links are connected to the shaft to cause the same to bend under loads carried by the links and a sensing member is connected at one end to the shaft and having its other end free to move relative to the shaft. For draft loads the shaft is relatively stiff in the vertical plane and flexible in a horizontal plane and the member is relatively stiff in a horizontal plane and flexible in a vertical plane. Control means for a valve are coupled to the other end of the member and operated by relative movement of the free member in the horizontal plane caused by changes in draft forces on the links, and being insensitive to deflection of the shaft caused by vertical force components on the links.

5 Claims, 8 Drawing Figures

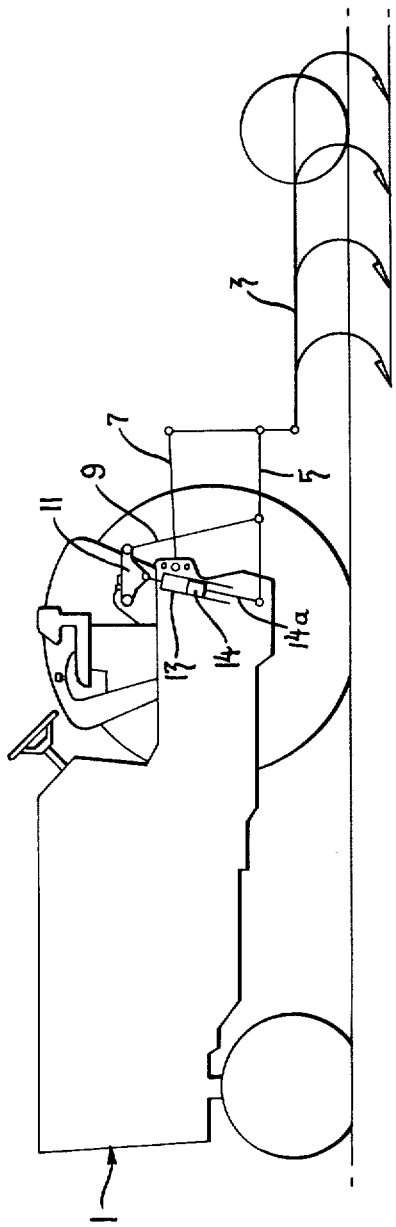
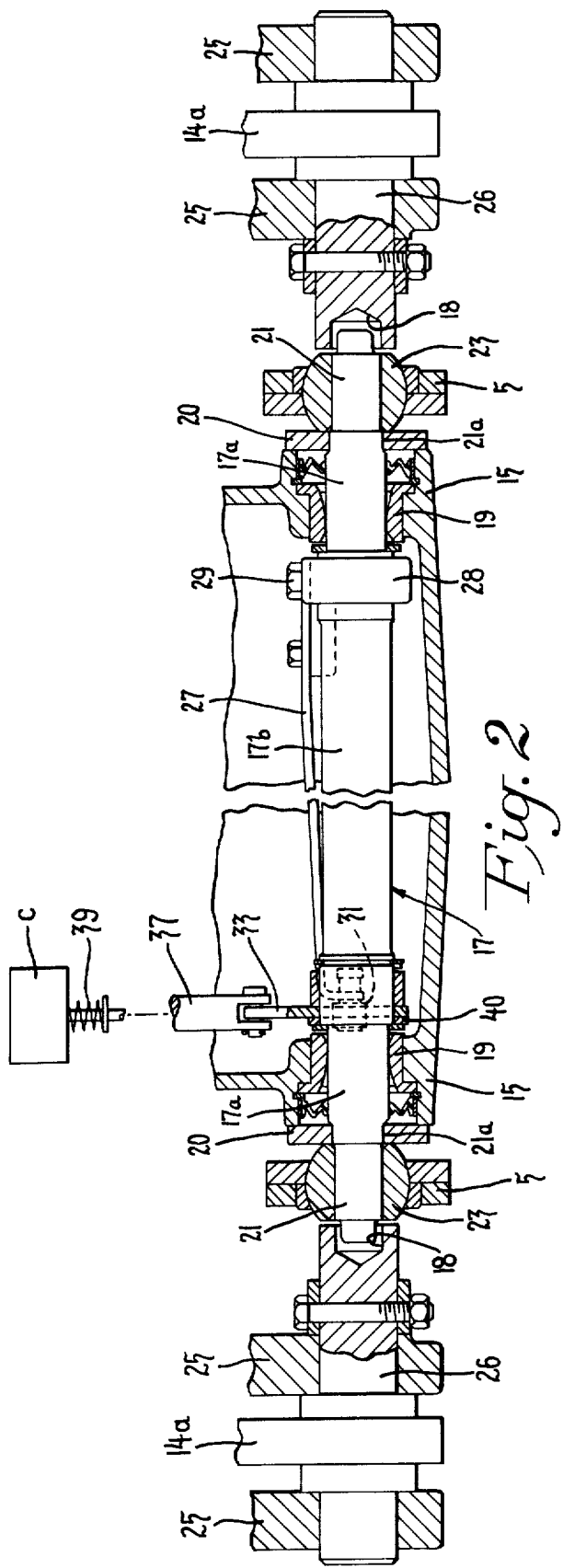

DRAFT SENSING APPARATUS FOR TRACTOR

This invention relates to tractors of the type equipped with a power controlled implement hitch linkage and more particularly with an improved draft sensing unit and control for the linkage.

Tractors, particularly of the agricultural type, generally utilize an elevatable powered three-point hitch linkage for coupling the tractor to implements. There generally is employed a draft sensing means which directly or indirectly measures the draft load between the implement and the tractor and acts through the linkage control system to raise or lower the linkage and implement so as to maintain a substantially constant preset draft load.

One method of automatically controlling the linkage is to measure the forces acting on certain components of the linkage and to utilize changes in these forces to control the vertical position of the linkage so as to maintain the forces relatively constant. This type of control is commonly called draft control. Various means of measuring the forces have been employed including having the upper or lower links connected to the tractor through a resilient member. Changes in deflection of the resilient member can then be used as a control input.

Where the linkage member or members, such as the lower draft links, are connected to the implement at a point spaced from the lifting point on the links there are reaction forces on the linkage pivot points that have both vertical and horizontal forces. The vertical forces are primarily due to the resultant implement weight and soil suction forces while the horizontal forces are primarily due to the horizontal draft forces. Since it is changes in the draft forces that are useful indicators to control the vertical position of the linkage in order to maintain essentially constant draft loads, it is desirable to eliminate the effect of the vertical forces on any load sensing apparatus. The linkage loads may be measured by measuring the bending deflection of a cross shaft having a stiff member attached thereto in the manner shown in the pending U.S. application Ser. No. 200,958 filed Nov. 22, 1972 entitled "Draft Sensing Unit for Tractor" now Pat. No. 3,812,916 dated May 28, 1974. In that arrangement changes in both vertical and horizontal forces are measured and amplified. It is an object of this invention to provide a draft sensing apparatus that has the out large force range and fine sensitivity advantages of the device in the above mentioned application while eliminating the effects of the undesirable vertical forces on the sensing apparatus.

Other objects and advantages will be readily apparent from the following specification and accompanying drawings in which:

FIG. 1 is an outline of a tractor and hitch and implement combination on which the invention can be applied;

FIG. 2 is a generally cross-sectional view taken along a vertical plane and shows the draft sensing member and the connection of the draft sensing unit and the mounting thereof;

Figure 3:
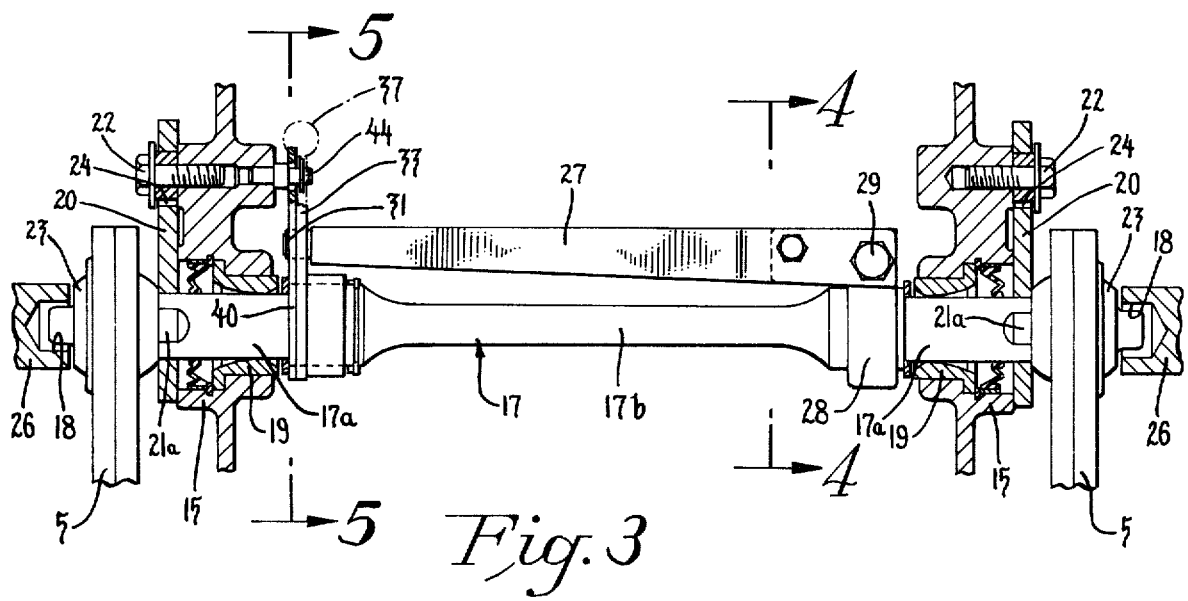
FIG. 3 is a generally cross-sectional view, taken along a horizontal plane and shows the draft sensing unit and the mounting thereof.
Figure 4:
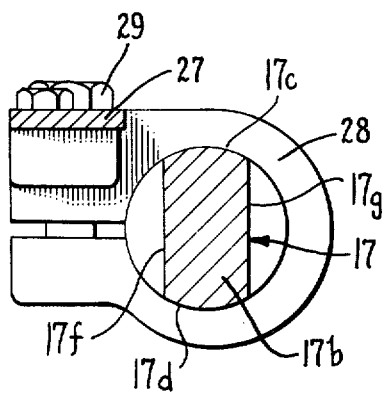
FIG. 4 is an enlarged sectional view taken on the line 4—4 of FIG. 3.

Referring now to the drawings:

FIG. 1 shows a tractor 1 coupled by a hitch to an implement 3. The hitch includes a pair of lower links 5, only one of which is shown, and a top link 7. The links 5 and 7 together comprise conventional three-point hitch. The lower links 5 are raised by lift links 9 connected to a lift arm 11 secured to a cross-shaft 16. The lift arm 11 is raised by means of a piston 14 operating in a hydraulic cylinder 13.

FIG. 2 and 3, the lower links 5 are shown supported on the ends of a shaft 17 which is, in turn, supported by fulcrum supports in the form of bearings 19 within a housing 15. Shaft 17 has cylindrical portions 17a, an intermediate portion 17b of smaller diameter in the horizontal plane than in the vertical plane and reduced end portions 21 which receive ball joints 23 on the lower links 5. The tractor includes a forked support member 25 on each side thereof within which is located the lower ends of the piston rods 14a. The piston rods 14a are pivotally attached to the short stub shafts 26. The reduced end portions 21 on the shaft 17 are loosely received within depressions 18 which are in the end of the short stub shaft 26. The reduced end portions can move freely therein within limits.

A pair of plates 20 are carried on the shaft 17 and are attached by bolts 22 to the housing 15. The plates are non-rotatably attached to the shaft 17 as by splines or flats 21a. This prevents rotation of the shaft 17. The bolts pass through slots 24 in the plates and the slots permit fore and aft movement of the shaft due to the draft forces. As seen in FIGS. 2 and 3, the reduced end portions 21 are free to move within a limited range in the depressions 18 in the ends of the short stub shafts 26. Maximum bending of the shaft 17 in either direction will cause the reduced end portions 21 to engage the sides of the holes in short stub shafts 26 to act as a stop limiting further bending of the shaft 17.

Figure 5:
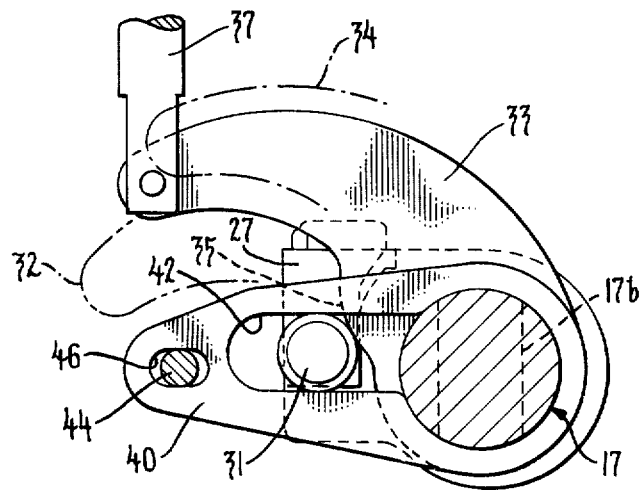
FIG. 5 is another enlarges sectional view taken on the line 5—5 of FIG. 3.

An elongated flat member 27 is affixed by a clamp 28 to the right end portion 17a FIG. 2 of shaft 17. A bolt 29 acts to tighten the clamp on the shaft. As taught in the above mentioned Pat. No. 3,812,916, the member 27 is clamped to the shaft 17 at or near a point of maximum angular deflection. The opposite end of the elongated member 27 carries a roller 31 that engages a cam or cam member 33 rotatably carried on the left end portion of the shaft 17. As seen in FIG. 5, the cam or cam member 33 has a cam surface 35 engaged by the roller 31 to cause the cam member 33 to be rotated about its axis coincident with the axis of the shaft 17. The cam member 33 is pivotally connected at its outer end to the lower end of a link rod 37 which transmits motion of the cam member 33 to a control mechanism.C. A spring 39 acts between a stationary portion on the tractor and the link rod 37 to urge it downwardly and thereby cause the cam member 33 to bear against the roller 31.

As seen in FIG. 5 an elongated arm 40 is mounted on the shaft 17. The arm has a slot 42 into which the roller 31 on the end of elongated member 27 extends. The slot permits fore and aft movement of the roller and elongated member 27 relative to the cylindrical shaft 17 but prevents relative vertical movement therebetween. Rotation of elongated member 27 and elongated arm 40 about the shaft axis is prevented by a pin 44 extending from a hole in the housing 15 into a second horizontal slot 46 formed in the arm 40. The slot permits horizontal movement of the shaft 17 relative to the housing 15 but prevents both vertical movement and rotational movement of the elongated member 27 and attached shaft 17 relative to the housing. The motion control means includes the arm 40, slot 46 and pin 44.

The control C, details of which form no part of the invention, may be of any suitable form which includes hydraulic valve means that will cause the hydraulic cylinder and piston 13-14 to be actuated to raise and lower the links in accordance with changes in the loads or forces on the links.

Figure 6:
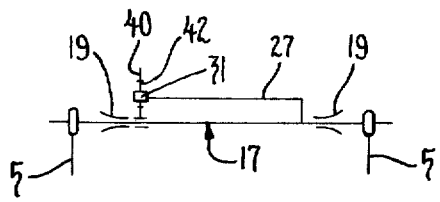
FIG. 6 is a diagrammatic view of the draft sensing unit in zero load condition.

When the tractor is pulling an implement, there are tension or pulling forces in the lower links 5. These forces act horizontally on the reduced ends 21 of the shaft 17 to bend the same as shown diagrammatically in FIG. 7. FIG. 6 shows the shaft 17 in an unstressed or zero load condition. As the shaft 17 bends, the clamp end of the elongated member 27 remains parallel to the shaft at the point of clamping. Since the other end of the elongated member 27 is free to move horizontally in the slot 42, the elongated member 27 remains straight. The movement of the free end of the elongated flat member 27 towards and away from the shaft 17 is thus a function of the angle of deflection or slope of the curve of the bent shaft.

Figure 7:
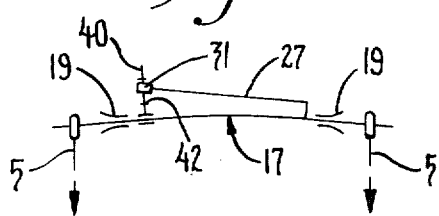
FIG. 7 is a diagrammatic view of the draft sensing unit showing horizontal deflection.
Figure 8:
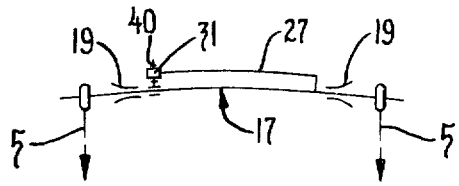
FIG. 8 is another diagrammatic view of the draft sensing unit showing vertical deflection.

The effect of vertical components in the forces acting through the lower links 5 is shown schematically in FIG. 8. The elongated arm 40 attached to the shaft 17 constrains the roller 31 on the elongated member 27 to cause the elongated member 27 to bend and assume the same shape as the shaft 17. There is thus, no relative movement between the shaft 17 and elongated member 27 and hence the vertical force components do not affect the sensing members 33-31 which operate only in response to changes in horizontal forces as shown in FIG. 7.

When the loading effect of the weight of the implement supported by the tractor linkage is greater than the loading effect of the draft forces between the implement and tractor there will be a compression force on the lower links 5 and the cylindrical shaft 17 will bend in the opposite direction from that shown in the figures. The end of elongated member 27 will move in the slot 42 to a point closer to the shaft than when the shaft is in unstressed condition. FIG. 5 illustrates in solid lines, the zero load positions of cam member 33 and in dot and dashed lines the extreme positions of the cam member 33 when under maximum horizontal loading. The dashed lines 32 indicate the maximum tension position under loads equally applied to opposite ends of the shaft.

The major and minor dimensions of the intermediate portion 17b are transverse to one another and the length of the shaft. In the embodiment set forth in the drawings the major dimension is the transverse diameter between the cylindrical surfaces 17d and c and the minor dimension is the dimension between the flat sides 17f and g. The shaft is more sensitive to horizontal loads and the bending stresses caused by the horizontal loads are lower than they would be in a shaft of uniform stiffness of the same magnitude as the stiffness of the shaft in the major dimension thereof.

The flat elongated member 27 is thick and hence is stiff in its horizontal plane so as to remain straight but is thin and hence flexible in the vertical plane so that it will easily bend and conform with the shaft 17 during horizontal bending of the same.

The embodiments shown are merely an example of one way of measuring the slope or angle of the shaft 17 in its horizontal plane. Other means could be utilized for sensing the angle change and these are deemed to be within the scope of the invention. Furthermore, the invention could be applied to tractors wherein the forces in the upper link were measured to control the linkage to maintain any predetermined draft load. Such modifications are deemed to be within the scope of the invention which is limited only by the following claims.

We claim:

1. A tractor draft sensing apparatus having an elongated load measuring shaft mounted on spaced supports, draft means connected to the shaft at points spaced from the supports whereupon forces on said draft means causes the shaft to bend, sensing means for measuring deflection of the shaft including an elongated member attached at its first end to the shaft, means for measuring relative movement of the shaft and the other end of the member and means for limiting relative movement between said shaft and other end of the elongated member in one plane so that only relative movement between said shaft and the other end of the elongated member in a second plane is measured.

2. The tractor draft sensing apparatus of claim 1 wherein the one plane is a vertical plane and the second plane is a horizontal plane.

3. The tractor draft sensing apparatus of claim 2 wherein the elongated member is relatively thin and hence flexible in its vertical plane so that it can bend to conform to any bending of the shaft in its vertical plane.

4. The tractor draft sensing apparatus of claim 2 wherein the shaft is thicker in its vertical dimension than in its horizontal dimension so that resistance to vertical bending of the shaft by the draft means is greater than the resistance to horizontal bending of the shaft by the draft means.

5. The tractor draft sensing apparatus of claim 2 wherein the means for measuring relative movement of the shaft and the other end of the elongated member includes a cam member rotatably mounted on the shaft, a cam follower carried by the other end of the elongated member and engaging said cam member to cause the same to rotate on the shaft upon relative bending movement of the shaft and elongated member said means for limiting relative movement between said shaft and the other end of the elongated member including an arm carried by the shaft, said arm having a horizontal slot therein into which the cam follower extends and means for preventing vertical movement of said arm whereby said elongated member and cam follower can move horizontally relative to said shaft but is prevented from moving vertically relative to said shaft.

* * * * *